(12) United States Patent
Duselis et al.

(10) Patent No.: US 6,346,146 B1
(45) Date of Patent: Feb. 12, 2002

(54) BUILDING PRODUCTS

(75) Inventors: Steve Duselis, Kings Park; Peter Goodwin, Rosehill; Nigel Kirby, Warrawee; Basil Naji, Parramatta; Anhthe Nguyen, Belmore; Brian Sloane, Old Toongabbie; David Stitt, Chatswood; James Gleeson, Collaroy Plateau, all of (AU)

(73) Assignee: James Hardie Research PTY Limited (AU)

( * ) Notice: Subject to any disclaimer, the term of this patent is extended or adjusted under 35 U.S.C. 154(b) by 0 days.

(21) Appl. No.: 09/058,444

(22) Filed: Apr. 9, 1998

(30) Foreign Application Priority Data

Apr. 10, 1997 (AU) .............................................. PO6120

(51) Int. Cl.$^7$ ............................................. C04B 14/04
(52) U.S. Cl. .................. 106/713; 106/470; 106/600; 106/737
(58) Field of Search ............................ 106/713, 737, 106/600, 470

(56) References Cited

U.S. PATENT DOCUMENTS

| | | | |
|---|---|---|---|
| 4,101,335 A | * | 7/1978 | Barrable |
| 4,131,638 A | | 12/1978 | Whitaker et al. ........... 264/333 |
| 4,132,555 A | * | 1/1979 | Barrable |
| 4,770,831 A | | 9/1988 | Walker |
| 5,547,505 A | | 8/1996 | Nakatsu et al. ............. 106/713 |
| 5,580,508 A | | 12/1996 | Kobayashi et al. ......... 264/234 |

FOREIGN PATENT DOCUMENTS

| | | | |
|---|---|---|---|
| AU | 515151 | | 7/1980 |
| AU | 552930 | | 10/1983 |
| AU | 606344 | | 4/1989 |
| DE | 23 44 773 A | | 3/1975 |
| DE | 37 11 549 A | | 10/1987 |
| EP | 0 007 585 A1 | | 7/1979 |
| EP | 0 069 095 A1 | | 6/1982 |
| EP | 0 846 666 A1 | | 6/1998 |
| JP | 57183344 | * | 11/1982 |
| JP | 59045953 | * | 3/1984 |
| JP | A 92-17659 | | 12/1984 |
| SU | 411054 | * | 1/1974 |

OTHER PUBLICATIONS

"High–strength, extrusion–molded, lightweight calcium silicate product.", Chemical Abstracts, vol. 84, No. 16, Apr. 19, 1976 (Apr. 9, 1976) Columbus, Ohio, U.S.

"Mixture for autoclaved lime–silica concrete", Chemcial Abstracts, vol. 103, No. 22, Dec. 2, 1985 Columbus, Ohio, U.S.

"High–strength calcium silicate products", Chemical Abstracts, vol. 95, No. 2, Jul. 13, 1981 Columbus, Ohio, US.

* cited by examiner

*Primary Examiner*—Paul Marcantoni
(74) *Attorney, Agent, or Firm*—Knobbe, Martens, Olson & Bear LLP

(57) ABSTRACT

A formulation for preparing a cementitious product comprising a cementitious material, a siliceous material, and a low bulk density material being substantially calcium silicate hydrate and including unreacted siliceous reactant. A method of forming a cementitious product comprises adding a cementitious material, a siliceous material and a low bulk density material to water to form a slurry, forming a green shaped article from the slurry and curing the article in an autoclave, wherein the low bulk density material is substantially calcium silicate hydrate and includes unreacted siliceous reactant.

78 Claims, 1 Drawing Sheet

BUILDING PRODUCTS

TECHNICAL FIELD

This invention relates to low density building products and methods for their production.

BACKGROUND ART

Shaped calcium silicate products are widely used in industry and domestic applications as thermal insulation and refractory materials and shown in Australian Patent No 552,930. These products are commonly formed by combining a source of calcium hydroxide with a siliceous material at elevated temperature and pressure. A variety of crystalline forms of calcium silicate may be formed depending upon the temperature, pressure, length of reaction time and water concentration used. The resultant slurry of hydrated calcium silicate crystals may then be cast into moulds and dried, usually by the application of heat, to form the desired finish shaped products prior to moulding if desired. Reinforcing fibres such as glass and polyester fibres may then be added to the slurry.

Such pure calcium silicate products, however, do not have sufficient strength, toughness and durability for various building applications. Various mechanisms have been proposed for producing calcium silicate products with sufficient strength for building applications. Low density calcium silicate boards using fibre contents of 3% by weight or less are well known in fire protection applications. The method of manufacture of the calcium silicate in these products and the other ingredients needed for high temperature (>1000° C.) stability make such product uneconomical for use as commodity products. For example, U.S. Pat. No. 5,547,505 discloses a production method for low heat cements with good compressive strength and heats of hydration. The process is, however, quite complex. It involves the mixing of calcareous materials, siliceous materials and aluminous materials, melting the mixture, quenching the melt and grinding the quenched matter for inclusion in the cement composition.

Australian Patent No 606,344 attempts to overcome the difficulties associated with calcium silicate products by adding fibrous materials, such as wood pulp, and a suitable polymeric coagulant, forming thin sheets of the resulting material and laminating the sheets to form a building board. Various other production techniques or additives such as fibres, polymeric binders etc have been used to increase the strength and durability of the calcium silicate product. German Patent Application DE 3711549 for example includes a polymeric binder and an expansion ettringite forming agent to the calcium silicate slurry to give a product similar to wood.

Fibre reinforced cement products such as water resistant building sheets have been used for building since 1895. In recent history reinforcing fibres used in such products have included not only asbestos fibres, but also cellulose fibres (AU 515151), metal fibres, glass fibres and other natural fibres. Typically the density of such building sheets is from 1.2–1.7 g/cm$^3$, the variation in density typically being achievable by compression and dewatering of the fibre cement slurries used in manufacture and by varying the amount of fibre used.

The densities of the building sheets described above mean the products are heavier than timber based products of equal dimension and consequently are more difficult to cut, machine and nail than timber and timber based products. In this regard, the density of natural timber sheets typically range from 0.7 to 0.9 g/cm$^3$ for dry hardwoods and from 0.38 to 0.6 g/cm$^3$ for dry softwoods. The dry density of reconstituted pressed hardboards typically range from 0.95 to 1.1 g/cm$^3$.

It would be desirable to manufacture building sheets having a density similar to that of timber thus enabling lighter, more nailable, easier to cut and easier to machine products whilst retaining the durability, fire resistance, rot proofness and water resistant properties of the fibre reinforced cement product.

It is an object of the present invention to substantially ameliorate at least some of the above-mentioned disadvantages of the prior art or at least provide a commercial alternative thereto.

DISCLOSURE OF THE INVENTION

Figure 1:
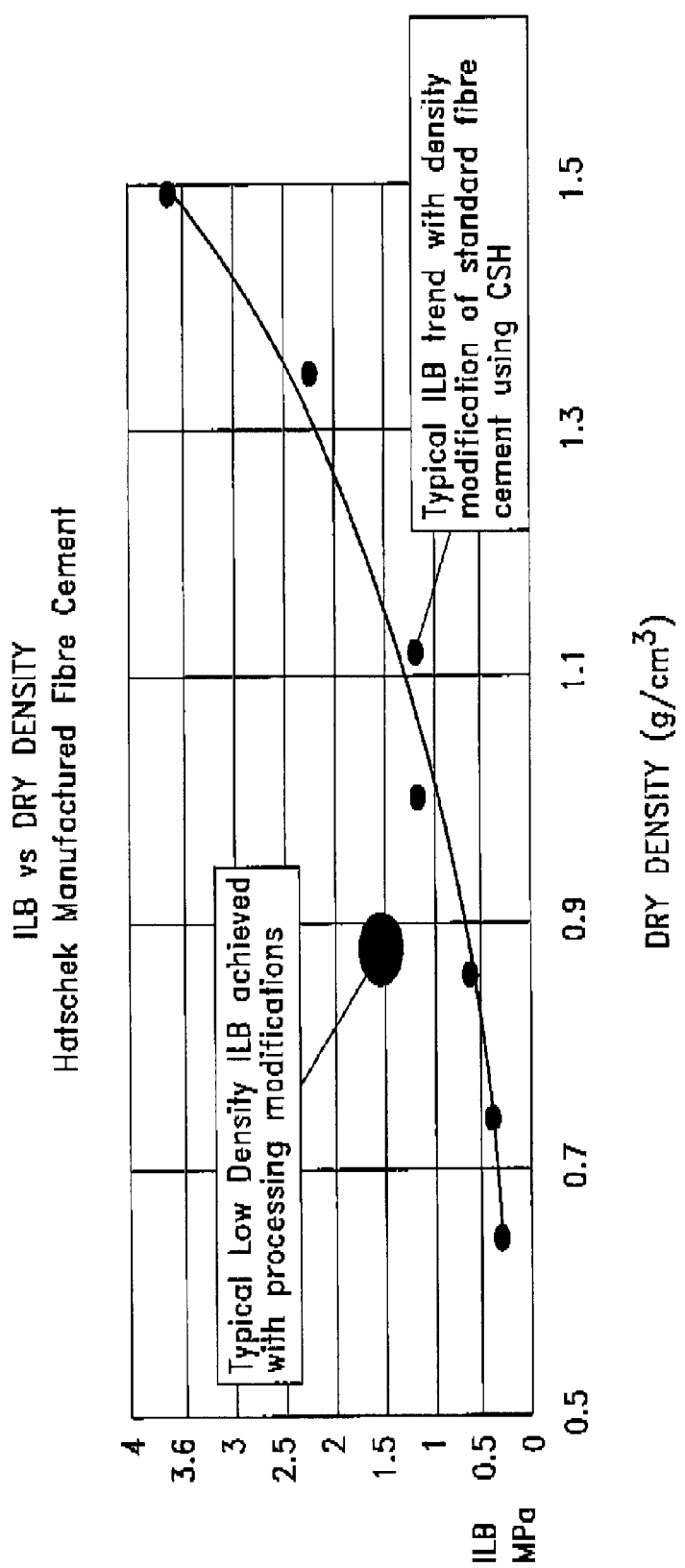
FIG. 1 is a graph showing the inter-laminar bond (ILB) achieved with sheet produced using standard formulation fibre-cement with unbleached pulp, density modified by the addition of CSH.

According to a first aspect, the present invention provides a method for forming a cementitious product comprising adding a cementitious material, a siliceous material and a low bulk density material to water to form a slurry forming a green shaped article from the slurry and curing the article in an autoclave wherein the low bulk density material is substantially calcium silicate hydrate.

The applicant proposes to use calcium silicate hydrate as a density modifier since unlike commonly used materials such as vermiculite, perlite or EPS foam beads, it does not float and it resists crushing.

The low bulk density material is made up of particles being substantially calcium silicate hydrate, typically in the form of a 3-D interlocking structure containing beads and is resistant to crushing in subsequent processing.

Preferably the low bulk density material has a bulk density between 0.06 and 0.3 g/cm$^3$.

In another preferred embodiment, the low bulk density material is provided by reacting a siliceous reactant with a calcareous reactant in the presence of water under pressure and elevated temperature, wherein at least 90 wt % of the siliceous material has a particle size of less than 100 microns.

According to the inventive process for forming a cementitious product, the green shaped articles may be formed from the water borne slurry by any of a number of conventional processes such as the Hatschek sheet process, the Mazza pipe process, the Magnani sheet process, injection moulding, extrusion, hand lay-up, moulding, casting, filter pressing, flow on machine, roll forming, etc., with or without post-formation pressing. After forming, the green article is preferably pre-cured for a short time preferably up to 80 hours, then cured by autoclaving preferably in a steam pressurised vessel at 120 to 200° C. for 3 to 30 hours, most preferably for less than 24 hours. The length of time and temperature chosen for curing is dependent on the formulation, the manufacturing process and form of the article.

The applicant has also found that it is possible to provide a low bulk density material which is substantially composed of calcium silicate hydrate for use in a building product without it being necessary to ensure full conversion of the reactants to calcium silicate hydrate. In a preferred embodiment this reaction is terminated prior to complete conversion of the reactants to calcium silicate hydrate. Preferably the reaction is terminated at less than 4 hours. More preferably the reaction is conducted over a period of up 2 hours such that at least 80% of the calcareous reactant material is converted into calcium silicate hydrate (preferably as determined from DTA (differential thermal analysis)/TGA (thermogravimetric analysis)).

The applicant has found that the product resulting from the reaction between the siliceous reactant material and the calcareous reactant material at elevated temperature and pressure even at very short reaction times, e.g. down to ½ hour with appropriate apparatus, is suitable for use in building products such as fibre reinforced sheets. Such short reaction times clearly provide advantages both in terms of cost and speed of production.

The product resulting from this reaction not only serves as an effective density modifier for producing cementitious products resulting in densities of 1.2 g/cm$^3$ to 0.5 g/cm$^3$ and if combined with aeration of the slurry, the density may be even lower, but provides other advantages including high strength and low surface water permeability.

Another advantage of producing such low density cementitious products in accordance with the invention is that thicker sheets or thicker walled products can be manufactured, including those containing fibres, without being excessively heavy for handling. In addition such thick sheets, for example 10 mm–35 mm thick, are able to be nailed or machined (which is not always possible with normal density or compressed fibre cement sheets). The low density cementitious products of the invention are also suitable for fixing with power driven nail guns since the lower density of the board enables the impact and head of the nail to be absorbed into the board unlike normal density or compressed fibre cement boards which may fracture by the impact of the head of the nail. The low density of the inventive cementitious products also enables for example sheets of say up to 12 mm thickness×1200 mm wide to be scored and snapped. Normal density fibre cement sheets would be too strong and dense to score and snap at such dimensions.

Even at densities below 0.5 g/cm$^3$ the cementitious products resulting from the present invention have surprisingly good strength and toughness. The applicants have also noticed that the low density cementitious products resulting from the inventive process have lower water surface permeability as compared with conventional cementitious products.

The siliceous reactant material may be obtained in the correct particle size or alternatively ground by any appropriate method including a high impact type ball or rod mills, vertical stirred ball mill or attrittor mill. Such mills obtain high particle size reduction rates by impact fracture of particles. The siliceous reactant material preferably has particle size of 90 wt % less than about 100 micron more preferably less than 70 micron and most preferably less than 50 micron diameter (as measured on a laser diffraction particle size analyser such as a Malvern Mastersizer diffraction type particle size analyser).

Suitable siliceous reactant materials are crystalline, most preferably such as quartz, quartzite sand, quartzite rock or crystalline silica. Amorphous siliceous reactant materials can also be used but are less desirable. Typical amorphous siliceous materials include diatomaceous earth, silica fume, rice hull ash, fly ash, blast furnace slag, granulated slag, steel slag, crystalline or air cooled slag, geothermal silica and mixtures thereof. The siliceous material in steps (a) and (c) may be the same or different.

The silica particle size may be adjusted if desired to alter reaction rates for forming the substantially calcium silicate hydrate product. Other process parameters or additives may be altered to adjust the various properties of the resultant building product including density, toughness etc.

Suitable calcareous materials include lime particularly quick lime preferably containing greater than 90% CaO. Quick lime can be hydrated by slaking it in water, preferably at a temperature of 40° to 70° C. in a ratio of 1 to 7 liters of water per kilogram of lime.

Water in the reaction is typically present in an amount of up to 30 times the total weight of the siliceous and calcareous reactant materials.

Suitably the siliceous material and calcareous material are reacted at a temperature between 120° C. and 250° C., more preferably at a temperature of between 160° C. and 180° C.

Preferably the siliceous and calcareous materials are reacted in a stirred pressure vessel. Suitable pressures used are typically between 200 and 4000 kPa, more preferably between 600 and 1000 kPa.

Typically, the calcareous material and siliceous material are reacted in a molar ration of $CaO:SiO_2$ of from 0.1 up to 1.2. More preferably they are reacted in a ratio of 0.3–0.8.

The present invention further provides a formulation for preparing a cementitious product comprising:
 a cementitious material
 a siliceous material, and
 a low bulk density material being substantially calcium silicate hydrate.

Throughout this specification, unless indicated otherwise where there is reference to wt %, all values are with respect to the formulation on a dry ingredients weight basis prior to addition of water and processing.

The siliceous material is preferably present in the dry formulation in an amount of from 10 to 80 wt %, more preferably 30 to 70 wt %, most preferably 40 to 65 wt %. Preferably the siliceous material is ground sand (also known as silica) or fine quartz and has an average particle size of 1 to 500 microns, more preferably 20 to 70 microns.

The cementitious material is preferably present in the dry formulation in an amount of from 10 to 80 wt %, more preferably 20 to 70 wt %, most preferably 30 to 40 wt %. Suitable cementitious material is cement and/or lime and/or lime containing material and includes Portland cement, hydrated lime, lime or mixtures thereof. Preferably the cementitious material has a fineness index of 200 to 450 m$^2$/kg and more preferably 300 to 400 m$^2$/kg.

It will be appreciated that the siliceous material and cementitious material may originate from separate source materials e.g. silica and Portland cement or can originate from a single source material e.g. a blended cement which is a cement including ordinary Portland cement and/or off-white cement with one or a combination of limestone, granulated slag and condensed silica fume. The proportion of these additions is in excess of 5% by mass.

Similarly, the siliceous reactant material and calcareous reactant material can be provided from separate sources e.g. silica and limestone or from a single source material e.g. a siliceous limestone deposit.

The low bulk density calcium silicate hydrate of the invention is preferably added in an amount of up to 80 wt %, more preferably up to 50% of the dry formulation.

The cementitious product can include a fibrous material capable of producing a fibre reinforced product. Suitable fibrous materials can include asbestos however it is more preferable to use non-asbestos fibres including cellulose such as softwood and hardwood cellulose fibres, non wood cellulose fibres, mineral wool, steel fibres, synthetic polymer fibres such as polyamides, polyesters, polypropylene, polymethylpentene, polyacrylonitrile, polyacrylamide, viscose, nylon, PVC, PVA, rayon, and glass, ceramic or carbon. When cellulose fibres are used, they are preferably refined to a degree of freeness of between 20 and 800 Canadian Standard Freeness (CSF), more preferably 200 to 500 CSF. Thermomechanically or chemically refined fibres are preferred. Cellulose fibres produced by the Kraft process are suitable. The cellulose fibres may be bleached, unbleached, partially bleached or mixtures thereof. The fibrous materials may be present in a concentration of 0 to 25 wt %, preferably 2 to 16 wt %, more preferably 5 to 14 wt % based on the weight of the dry formulation.

The density of the cementitious product material resulting from the present inventive process will depend upon a number of factors including the quantity of low density substantially calcium silicate hydrate material and fibrous material or pulp added to the mix. Shown below in Tables 1, 2 and 3 are saturated, equilibrium and oven-dried densities of cementitious product resulting from the present inventive process with varying amounts of CSH material and pulp.

TABLE 1

WATER SATURATED
DENSITY (g/cm$^3$) MODIFICATION OF FIBRE REINFORCED
CEMENTITIOUS PRODUCT WITH CSH MATERIAL AND PULP

| CSH % | DENSITY WITH 8.25% PULP | DENSITY WITH 11.25% PULP | DENSITY WITH 14.25% PULP |
|---|---|---|---|
| 0 | 1.700 | 1.650 | 1.590 |
| 10 | 1.600 | 1.570 | 1.530 |
| 20 | 1.520 | 1.500 | 1.470 |
| 30 | 1.440 | 1.440 | 1.420 |
| 40 | 1.420 | 1.380 | 1.360 |
| 50 | 1.340 | 1.320 | 1.320 |

TABLE 2

ATMOSPHERIC EQUILIBRIUM
(nominally 25° C. and 50% relative humidity)

| CSH % | DENSITY WITH 8.25% PULP | DENSITY WITH 11.25% PULP | DENSITY WITH 14.25% PULP |
|---|---|---|---|
| 0 | 1.334 | 1.188 | 1.178 |
| 10 | 1.132 | 1.035 | 1.021 |
| 20 | 1.036 | 0.815 | 0.897 |
| 30 | 0.969 | 0.779 | 0.800 |
| 40 | 0.920 | 0.682 | 0.748 |
| 50 | 0.641 | 0.596 | 0.608 |

TABLE 3

OVEN DRIED
(100° C. 24 hour.)

| CSH % | DENSITY WITH 8.25% PULP | DENSITY WITH 11.25% PULP | DENSITY WITH 14.25% PULP |
|---|---|---|---|
| 0 | 1.127 | 1.161 | 1.115 |
| 10 | 1.045 | 1.011 | 0.966 |
| 20 | 0.912 | 0.880 | 0.864 |
| 30 | 0.794 | 0.771 | 0.767 |
| 40 | 0.702 | 0.684 | 0.669 |
| 50 | 0.617 | 0.587 | 0.591 |

The cementitious product may also contain 0 to 40 wt % of other additives such as fillers, for example, mineral oxides, hydroxides and clays, metal oxides and hydroxides, fire retardants, for example, magnesite or dolomite, thickeners, silica fume or amorphous silica, colorants, pigments, water sealing agents, water reducing agents, setting rate modifiers, hardeners, filtering aids, plasticisers, dispersants, foaming agents or flocculating agents, waterproofing agents, density modifiers or other processing aids. Specific additives can include aluminium powder, kaolin, mica, metakaolin, silica fume and calcium carbonate.

In a preferred embodiment, the low density cementitious products are formed by the Hatschek process. For use with the inventive low density cementitious composition, however, certain modifications to the Hatschek process may be required or desired.

Firstly, with the low density cementitious composition, delamination of the green sheet may occur when the vacuum pad contacts the sheet to try and lift it from the conveyor up onto a stack. It is believed this occurs due to the weight of the sheet being too heavy to be supported by the wet interlaminar bond of the material because of the sheet thickness and high moisture content (approximately double the green sheet moisture content of normal fibre reinforced cement). Further, although the green sheet moisture content is higher than usual, it is possible that the green sheet is in fact too dry leading to a weak wet bond between laminates.

This green sheet delamination may be avoided or at least reduced by inclusion of an additive e.g. bentonite 0.6% to increase the bond between the laminates.

The applicant has also developed several modifications to the Hatschek process to improve the green sheet properties. Apart from the conventional techniques of:

a) increasing the pre-curing time
b) adding a load to the top of some stacks after forming and maintaining such a load until after autoclaving, and/or
c) modifying the autoclave cycle (pressurising and depressurising rates) the applicants have found that adding bleached pulp instead of unbleached pulp to the formulation improves the properties of the green sheet for subsequent processing.

Further, the applicant has found that narrow widths of sheets (around 300 mm or less) even at 18 mm thickness are easier to process than a full sheet.

Surprisingly, the abovementioned processing modification also greatly increased the ultimate tensile strength or inter-laminar bond perpendicular to the face of the sheet. This is shown in the graph of FIG. 1. The curve shows the ILB (inter-laminar bond) achieved with sheet produced using standard formulation fibre-cement with unbleached pulp, density modified by the addition of CSH. The shaded region of the graph demonstrates the typical ILB achieved with the abovementioned processing modifications. The abovementioned modifications more than doubled the ILB at densities of around 0.8–0.9 g/cm$^3$.

In certain cases, it may also be desirable to treat autoclaved boards prepared in accordance with the invention with a silane, siloxane or another silicone treatment. While the surface water permeability of the building products produced by the inventive process is low as compared with conventional boards, such treatment may be necessary since the low density cement boards will have a large number of pores throughout. The silane, siloxane or other silicone treatment makes these pores hydrophobic thereby reducing water absorption and further lowering surface water permeability.

The applicant has found that the present inventive process provides building products with a surface water permeability of around 0.6 mL/hr (averaged over 48 hours) down to as low as 0.4 mL/hr whereas conventional boards have a surface permeability of around 0.8–1.9 mL/hr. Surface Water Permeability was measured by exposing a 50 mm diameter circular area of a 250×250 square sample to a 1.22 m column of water at 23±2° C. for 48 hours and measuring the drop in the water level over the 48 hrs. The result is quoted as mL drop per hour.

The term "comprising" is used throughout the specification in an inclusive sense that is to say in the sense of "including but not limited to" or "containing but not limited to". The term is not intended in an inclusive sense ie "consisting only of" or "composed only of".

MODES FOR CARRYING OUT THE INVENTION

The present invention will now be described with reference to the following examples which should be considered in all respects as illustrative and non-restrictive:

By way of explanation, the following terms are used throughout the examples.

Ordinary Portland cement—hydraulic binder consisting of calcium silicates, calcium aluminates and calcium aluminoferrites manufactured from Portland cement, clinker and gypsum. The binder may contain small quantities, usually less than 5% by mass, of limestone, fly ash, granulated slag or combinations of all three materials. Additives that alter setting time, water demand, drying shrinkage and other properties may also be contained.

Off-white Portland cement—hydraulic binder consisting of calcium silicates, calcium aluminates and calcium aluminoferrites manufactured from Portland cement, clinker and gypsum. The ferrite phases are minimised to below 4% to produce the off-white colour. This results in an increase in the silicate and aluminate phases. As with ordinary Portland cement, it may contain small quantities of other materials and additives to alter its properties.

Blended cement—hydraulic binder consisting of ordinary Portland cement and/or off-white cement and one or a combination of the following materials, limestone, granulated slag and condensed silica fume. The proportion of these additions in excess of 5% by mass. Additives that alter setting time, water demand, drying shrinkage and other properties may also be contained.

Fly ash—the fine material collected in electrostatic, mechanical filters or bag filters from boilers fired with pulverised fuels such as coal. Depending on the mineral types, fly ash can be pozzolanic with degree determined by the quantity and types of calcium silicates present. Fly ash is also known as pulverised fuel ash.

Slag—the material containing calcium, magnesium and other silicates, aluminates and aluminosilicates separated from smelting of metals such as iron, steel, copper, etc whilst in a molten state.

Iron blast furnace slag—a by-product separated from molten iron during manufacture of iron in an iron blast furnace. The material consists of calcium and magnesium silicates, aluminates and aluminosilicates as well as other minerals in smaller quantities.

Steel slag—a by-product separated from molten steel during manufacture of steel and its alloys. The material consists of calcium and magnesium silicates, aluminates and aluminosilicates as well as other minerals in smaller quantities.

Granulated slag—a glass material obtained by quenching molten slag in air, water or a mixture of both. This process known as granulation produces mainly amorphous materials that possess latent hydraulic properties.

Crystalline or Air-cooled slag—when molten slags are allowed to cool slowly, crystalline minerals result and the slag does not show any significant hydraulic properties.

It will be appreciated from the above, therefore, that the cementitious material and siliceous material in the inventive formulation may be provided by a single source material e.g. a blended Portland cement. It may also be envisaged that the calcareous reactant and siliceous reactant may be provided by a single source material e.g. a siliceous limestone deposit.

EXAMPLE 1

Synthesis of Low Bulk Density Calcium Silicate Hydrate

Process lime water is weighed into the batch tank at a ratio of 6.0 L water per kg of lime (CaO) in the batch. It should be noted that the present inventive process is suitable for use with both fresh town water or process water. The water is discharged into the mixing tank and then heated with steam to 65° C. The steam adds extra water. A 1300 kg batch of raw materials requires 628 kg of lime which is slaked in 3767 Liters of lime water and 672 kg dry weight of ground quartz sand in a slurry at 40% solids which is added to the slaked lime in a stirred tank. The preparation of the silica sand is described below.

The quartz sand was ground in a vertical stirred ball mill to a particle size such that 90% the volume of silica is less than 11.60 micron diameter as measured by a Malvern "Mastersizer" laser diffraction particle size analyser.

The slurry is mixed for 15 minutes then pumped into the stirred pressure vessel. Water is added to modify the viscosity of the slurry. The slurry is heated with steam to a pressure of approximately 700±50 kPa. The reaction is maintained at this pressure by addition of steam into the vessel. The material is maintained at pressure for 3 hours by further intermittent injection of steam. After 3 hours at full pressure, the pressure is then reduced to approximately 270 kPa in 30 minutes. The material is then discharged into a tank via a cyclone to allow the liberation of steam from the slurry. The slurry is then diluted with lime water to between 10–12 wt % dry solids of calcium silicate hydrate product. The slurry is then pumped to a stirred storage tank.

Properties of the Low Bulk Density Calcium Silicate Hydrate

The properties of the calcium silicate hydrate as synthesized by the method described above are listed below.

| PROPERTY | VALUE |
|---|---|
| % A.I.R. | 3.9% |
| % Unreacted | 7.5% |
| Tamped Dry Bulk Density (kg/m$^3$) | 217 ± 10 kg/m$^3$ |
| Filtration Time (seconds) | 107 ± 15 seconds |
| DTA - Wollastonite conversion peak temperature | 839° C. |

Definitions

% ACID INSOLUBLE RESIDUE (AIR)

% AIR is a measure of the unreacted quartz silica in the calcium silicate hydrate product. The method involves grinding 2 grams of sample and making it into a paste with water and then diluting with water to 200 mL, then adding 25 mL of analytical reagent Hydrochloric acid 32% w/w, density 1.16 g/mL (1:1). The mixture is heated at 90°–95° C. for 15 minutes and filtered through a No. 40 Whatman filter paper. The residue is washed with boiling water and boiling $Na_2CO_3$ (50 g/L). The residue and filter paper are then ignited at 900°–1000° C., cooled in a desiccator and the residue weighed. The residue mass expressed as a percentage of the initial sample mass is the % AIR.

% UNREACTED

% Unreacted is calculated as the % A.I.R. divided by the % silica of the batched dry raw materials ($SiO_2$ and CaO).

TAMPED BULK DENSITY

The calcium silicate hydrate product was dried in an oven at 105° C. The dried cake was broken up using a mortar and pestle and passed through 250 μm screens to remove lumps. Conglomerated material that failed to pass through the sieves was broken up by hand and sieved again. (100±1 cm$^3$) of the sieved sample was placed in a preweighed measuring cylinder. This cylinder was shaken on a vibrating table for 10 to 15 minutes with periodic stirring with a piece of wire. Once volume reduction ceased, the volume and mass were recorded. The mass of the sample divided by the volume of the sample, expressed in kg/m$^3$, was recorded as the Tamped Bulk Density.

FILTRATION TIME

Filtration Time is a measure of time taken for a 1.00 Liter sample of slurry to drain the water through a 12.5 cm diameter Buchner funnel and Whatman grade 541 filter paper, at a slurry temperature of 25°±5° C. under a vacuum of −60 kPa. The slurry shall be between 10 wt % and 12 wt % dry solids. The start time is when the slurry first covers the filter paper and the finish time is when the vacuum drops to −30 kPa as the filter cake shrinks or cracks.

DTA—WOLLASTONITE CONVERSION PEAK TEMPERATURE

Differential Thermal Analysis (DTA) is a method used to characterise calcium silicate hydrates. The test method involves heating approximately 30 mg of sample under nitrogen gas at a rate of 20° per minute from ambient to 1000° C. The difference in temperature between an empty reference sample holder and the sample is measured versus temperature. The tobermorite phase of calcium silicate hydrate is characterised by an exothermic conversion to wollastonite phase at temperatures between 824° and 840° C. Wollastonite conversion temperatures above 840° up to 900° C. are more typical of a reaction that has not proceeded to the tobermorite phase.

EXAMPLE 2

Cementitious Product Using Low Bulk Density CSH

The low bulk density calcium silicate hydrate made by the method of example 1 was then combined into a fibre cement matrix formed, via a Hatschek machine process, into a 10 mm flat sheet and autoclaved at 175° C. (900 kPa sat. steam pressure) for 8 hours. The formulation and properties of the material are described below.

| FORMULATION | FORMULATION 1 | FORMULATION 2 |
|---|---|---|
| Bleached Pulp refined to 200 to 250 mL csf freeness | 11.0% | 11.0% |
| Off-White Cement (−400 m$^2$/kg) | 39.2% | 41.0% |
| Silica (350–330 m$^2$/kg) | 39.2% | 27.4% |
| Low Bulk Density Calcium Silicate Hydrate (example 1) | 10.0% | 20.0% |
| Bentonite | 0.6% | 0.6% |

| FLAT SHEET MATERIAL PROPERTIES | | |
|---|---|---|
| PROPERTY | FORMULATION 1 | FORMLULATION 2 |
| 3-POINT FLEXURAL TEST | | |
| Density - OD (g/cm$^3$) | 0.87 | 0.79 |
| Density - sat (g/cm$^3$) | 1.45 | 1.39 |
| MOR ave - OD (MPa) | 14.57 | 11.63 |
| MOR ave - sat (MPa) | 9.26 | 7.54 |
| MOE OD (GPa) | 3.55 | 2.62 |
| MOE - sat - (GPa) | 2.21 | 1.52 |
| Toughness - OD (kJ/m$^3$) | 3.95 | 4.3 |
| Toughness - sat (kJ/m$^3$) | 16.83 | 14.05 |
| TENSILE TEST of interlaminar bond | | |
| ILB - (MPa) | 1.51 | 148 |

MOR ave = Average Modulus of Rupture of test breaks in perpendicular directions
MOE = Modulus of Elasticity
OD = Tested in an oven dry condition (24 hrs @ 105° C.)
sat = Tested in a saturated condition (24 hrs submersion)
ILB = ultimate tensile strength of the specimen (Inter-Laminar Bond tested perpendicular to the face of the sheet (44 mm × 44 mm sample size).

EXAMPLE 3

Synthesis of Low Bulk Density Calcium Silicate Hydrate

The example below demonstrates the art of converting lime and ground quartz silica to CSH of predominantly tobermorite phase within the short reaction time of only 2 hours with no greater than 10% Unreacted.

Silica sand of average particle size between 0.3 and 0.5 mm was ground in a vertical stirred ball mill. Silica was milled to a particle size of D[90]=8.84 μm. The D[90] value represents the particle size diameter that 90% of the weight of silica is less than, as measured by a 'Mastersizer' particle size analyser.

The lime and the milled silica were then mixed into an aqueous slurry and reacted in a stirred pressure vessel. The molar ratio of lime to silica was 1:1 and water was added to give a dry solids concentration of 4% ±1%. The reaction was heated from ambient to 170° C. ±5° C. and a steam pressure of 750 ±50 kPa in 40 minutes in the stirred pressure vessel and maintained at these conditions for 2.0 hours.

The extent of the reaction was measured by the acid insoluble residue test.

Properties of the Low Bulk Density Calcium Silicate Hydrate

The properties of the calcium silicate hydrate as synthesised by the method described above are listed below.

| PROPERTY | CSH made from 60 minute milled silica |
|---|---|
| Silica Particle size D[90] | 8.84 μm |
| % A.I.R. | 2.1% |
| % Unreacted | 4.1% |
| Tamped Dry Bulk Density (kg/m$^3$) | 84 ± 4 kg/m$^3$* |
| DTA - Wollastonite conversion peak temperature | 840° C. |

*The tamped dry bulk density of the calcium silicate hydrate resulting from Example 3 is much lower than Example 1 for several reasons including:
(i) Example 1 was a full-scale production in large 9 m$^3$ reactors whereas Example 3 is a small lab scale experiment using reactor vessels of only about 3–4 litres,
(ii) the silica particle size in Example 3 is much finer than the silica particle size in Example 1, and
(iii) the percent solids concentration in Example 3 is much lower than Example 1.

The tamped dry bulk density of the calcium silicate hydrate resulting from Example 3 is much lower than Example 1 for several reasons including:

(i) Example 1 was a full-scale production in large 9 m$^3$ reactors whereas Example 3 is a small lab scale experiment using reactor vessels of only about 3–4 litres, (ii) the silica particle size in Example 3 is much finer than the silica particle size in Example 1, and (iii) the percent solids concentration in Example 3 is much lower than Example 1.

EXAMPLE 4

Cementitious Product using Low Bulk Density CSH, Fibre Reinforcement and Aeration The density achievable by addition of low bulk density calcium silicate hydrate to cementitious and a fibre cement matrix are described in this example.

| RAW MATERIALS | FORMULATION 1 % | FORMULATION 2 % |
|---|---|---|
| Cellulose Pinus Radiatus unbleached pulp (refined to 400 to 450 ml csf freeness) | 11.25 | 0 |
| Portland Type A cement (320 to 350 m$^2$/kg) | 14.82 | 30 |
| Ground Quartz Sand (340 to 360 m$^2$/kg) | 22.24 | 30 |
| Calcium Silicate Hydrate (as described in eg 1) | 50.00 | 39 |
| Aluminium Powder | 0 | 1 |
| Metal Hydroxide | 1.69 | 0 |

Formulation 1 was manufactured by mixing and pressing a slurry of 3:1 water to solids between two meshes to dewater the slurry and form a monolithic sheet material. The sheet was then steam autoclaved at 175° C. for 8 hours.

Formulation 2 was manufactured by mixing the ingredients in a mass ratio of 3:1 water to solids and then autoclaving same as formulation 1. The 1% aluminium powder was added to supply aeration to the slurry via reaction to produce hydrogen and further lower the density and then autoclaved.

The resultant fibre reinforced cement products had the following properties

| PROPERTIES (Oven Dried 105° C. for 24 hrs) | FORMULATION 1 | FORMULATION 2 |
|---|---|---|
| Dry Density (g/cm$^3$) | 0.587 ± 0.019 | 024 ± 0.02 |
| MoR ave. (MPa) | 4.82 ± 0.39 | |
| MoE (GPa) | 0.94 ± 0.19 | |
| Toughness (kJ/m$^3$) | 2.69 ± 0.42 | |
| Thickness (mm) | 15.06 ± 0.45 | |

EXAMPLE 5

Silane Treatment

An undesirable property of fibre cement is the capillary rise of water up through the material when the lower edges are immersed in or saturated by water. The phenomenon is also commonly known as wicking. The hydrophilic nature of the cementitious pores induces the capillary action of water.

It was hypothesised that if the surface properties of the pores could be modified to produce a hydrophobic pore surface, the capillary rise of water could be reduced or stopped. A silane chemical was selected because of its ability to react with the hydroxyl groups at the pore surfaces and its hydrophobic nature of the tail of the molecule.

A silane supplied by Wacker Chemicals (GF 31) was selected to test the hypothesis. Methacryloxypropyltrimethyoxysilane, was used to treat Low Density Cementitious Board prepared in accordance with the present invention to reduce the rate at which water wicks through the board. This silane was chosen because it also bonds well with acrylics that are the most common binder in current paint coatings for fibre reinforced cement products.

The silane was prepared by hydrolysing 20 g of silane in 2L of 2 wt % acetic acid solution for 15 minutes. Two pre-dried low density board samples (250 mm ×250 mm ×10 mm) were soaked in the solution for 30 minutes, removed and dried at 105° C. for 12 hours. The samples were tested for wicking and water permeability and the results compared with a sample of untreated board.

Wicking testing involved constant immersion of the bottom 25 mm of the sample in clean tap water, and measurement of the height to which the water was drawn up in the middle of the sample over time.

Surface Water Permeability was measured by exposing a 50 mm diameter circular area of a 250×250 square sample to a 1.22 m column of water at 23 ±2° C. for 48 hours and measuring the drop in the water level over the 48 hrs. The result is quoted as mL drop per hour.

The results of the wicking test are indicated in the following table.

| | Wicking Results | |
|---|---|---|
| TIME OF IMMERSION | Wicking Height (mm) Untreated Board | Wicking Height (mm) Silane Treated Board |
| 35 minutes | 9 | 0 |
| 75 minutes | 9 | 0 |
| 2.5 hours | 10 | 0 |
| 5 hours | 12 | 0 |
| 7 hours | 15 | 0 |
| 3 days | 40 | 1 |

-continued

Wicking Results

| TIME OF IMMERSION | Wicking Height (mm) Untreated Board | Wicking Height (mm) Silane Treated Board |
|---|---|---|
| 5 days | 45 | 2 |
| 7 days | 51 | 3 |

Surface Water Permeability Results

| SAMPLE | PERMEABILITY (mL/hour) |
|---|---|
| Untreated | 0.59 |
| Silane Treated | 0.21 |

The results show that the silane treatment dramatically slowed or even prevented wicking, and that the surface water permeability of the board was substantially reduced.

EXAMPLE 6

Injection Moulded Cementitious Product using Low Bulk Density Calcium Silicate Hydrate (CSH)

The low bulk density CSH of a grade called "Microcel E" supplied by Celite Corporation was combined into fibre cement formulations and formed into a green shaped product via an injection moulding process. The moulded green product was then pre-cured for 8 to 12 hours then autoclaved as in Example 2. The properties of the "Microcel E", the formulation and the autoclaved material properties are shown in the table below:

PROPERTIES OF "MICROCEL E"

| | |
|---|---|
| Tamped Bulk Density (kg/m$^3$) | 170 |
| Filtration time (seconds) | approximately 110 |

| FORMULATION Raw Materials | FORMULATION 1 (wt %) | FORMULATION 2 (wt %) |
|---|---|---|
| Unbleached Kraft Pinus Radiata Fibre refined to 400–450 CSF | 11 | 0 |
| Bleached Kraft Pinus Radiata Fibre refined to 400–450 CSF | 0 | 11 |
| Shrinkage Limited Ordinary Portland Cement (335 m$^2$/kg) | 41 | 32 |
| Silica (360 m$^2$/kg) | 28 | 22 |
| Low Bulk Density Calcium Silicate Hydrate (Microcel E) | 20 | 35 |

The formulations above were mixed with process water to achieve slurry mixtures of a weight percent solids approximately equal to 12% to 17% prior to injection into moulds and press de-watering operations.

Flat Sheet Material Properties material was cut from a flat section of the moulded and autoclaved product. The thickness of the test sample was approximately 8 mm.

FORMULATION 1

| PROPERTY | OVEN DRY (105° C., 24 hours) | WATER SATURATED |
|---|---|---|
| Density (g/cm$^3$) | 0.93 | 1.63 |
| M.O.R. a (MPa) | 6.19 | 1.63 |
| M.O.E. a (GPa) | 0.77 | 0.61 |
| Energy to fracture (kJ/m$^3$) | 3.77 | 1.86 |

M.O.R. a = Modulus of Rupture using a single break per sample
M.O.E. a = Modulus of Elasticity using single break per sample

FORMULATION 2
Dry Density = 0.82 g/cm$^3$

| PROPERTY | WATER SATURATED |
|---|---|
| M.O.R. a (MPa) | 5.61 |

EXAMPLE 7

Cementitious Product using Low Bulk Density Calcium Silicate Hydrate (CSH) and Blended Cement A low bulk density calcium silicate hydrate was made by reacting 674 kg of ground silica (90 wt % <28.7 μm), 326 kg of lime and 5400 L of water for 2 hours at 175° C. in a stirred pressure vessel. This material was then combined with fibres into cementitious matrices to form flat sheets. Fibre reinforced cement sheets were produced using three formulations. The sheets were made by mixing the following materials to form a slurry, then pressing the slurry between fine sieve mesh to form a sheet material of 12 mm thickness. The sheets were autoclaved at 173° C. (860 kPa sat. steam pressure) for 5 hours. The formulations and properties of the material are described below:

| Raw Material | Formulation 1 | Formulation 2 | Formulation 3 |
|---|---|---|---|
| Bleached Kraft Pinus Radiata Fibre refined to 400–450 CSF | 11.0 | 11.0 | 11.0 |
| Shrinkage Limited Ordinary Portland Cement (335 m$^2$/kg) | 41.4 | 0 | 0 |
| Silica (360 m$^2$/kg) | 27.6 | 0 | 27.6 |
| Low Bulk Density Calcium Silicate Hydrate | 20.0 | 20.0 | 20.0 |
| Builders Cement (containing 40% Ground Granulated Blast furnace slag) (400 m$^2$/kg) | 0 | 69.0 | 0 |
| Marine Cement (Containing 60% Ground Granulated Blast Furnace Slag) (420 m$^2$/g) | 0 | 0 | 41.4 |

FLAT SHEET MATERIALS PROPERTIES

| Properties | Formulation 1 | Formulation 2 | Formulation 3 |
|---|---|---|---|
| 3 POINT FLEXURAL TEST After drying at 70° C. and 30% Relative Humidity | | | |
| Density (g/cm$^3$) | 0.967 | 0.964 | 0.920 |
| M.O.R ave (MPa) | 12.9 | 10.0 | 11.6 |
| M.O.E. (GPa) | 3.75 | 2.40 | 2.98 |
| Ultimate Strain ($\mu$m/m) | 3760 | 5470 | 4820 |
| Energy to Fracture (kJ/m$^3$) | 3.03 | 3.88 | 3.73 |

M.O.R. ave = Average Modulus of Rupture of test breaks in perpendicular directions
M.O.E. = Modulus of Elasticity
Ultimate = at Strain at maximum load

EXAMPLE 8

Cementitious Product using Commercially Available Low Density Calcium Silicate Hydrate A low bulk density calcium silicate hydrate sold under the trade name "Silasorb" by Celite Corporation was combined into a fibre cement matrix by a Hatschek machine process. Sheets of 11 mm thickness were autoclaved at 175° C. (900 kPa) saturated steam pressure) for 8 hours. The formulation and properties of the materials are shown below:

PROPERTIES OF SILASORB

| Tamped Bulk Density (kg/m$^3$) | 260 |
|---|---|
| Filtration Time (seconds) | 45–60 |

FORMULATION

| Raw Material | Formulation (wt %) |
|---|---|
| Bleached Kraft Pinus Radiata Fibre refined to 400–450 CSF | 11 |
| Shrinkage Limited Ordinary Portland Cement 335 m$^2$/kg | 41 |
| Silica (360 m$^2$/kg) | 28 |
| Low Bulk Density Calcium Silicate Hydrate | 20 |

FLAT SHEET MATERIAL PROPERTIES

| Property | Oven Dry (105° C., 24 hours) | Equilibrium (25° C. and 50% R.H.) | Water Saturated |
|---|---|---|---|
| Density (g/cm$^3$) | 0.87 | 0.90 | 1.46 |
| M.O.R. a (MPa) | 12.54 | 12.7 | 6.73 |
| M.O.E. a (GPa) | 3.28 | 2.91 | 1.39 |
| Energy to Fracture (kJ/m$^3$) | 3.25 | 8.53 | 14.79 |

M.O.R. a = Modulus of Rupture using single break per sample
M.O.E. a - Modulus of Elasticity using single break per sample The calcium silicate hydrate of the present invention is suitable for the production of cementitious products for both internal and external applications.

The present invention provides a general purpose low density fibre cement building material which is suitable for use in a wide range of applications. The present invention provides the ability to make thick fibre cement sheets while maintaining ease of nailing. This property provides new opportunities for development of specialised products such as timber trim replacement, siding, fascias, roofing, eave sheets and components thereof on external surfaces of buildings. Further, the inventive process is particularly well suited to the Hatschek process because the CSH material described unlike other common density modifiers such as vermiculite and perlite, does not float and resists crushing. These characteristics together with its ease of dewatering and other features described above enable high production rates on the Hatschek machine.

Although the invention has been described with reference to selected examples, it will be appreciated by those skilled in the art that the invention may be embodied in many other forms.

What is claimed is:

1. A method for forming a cementitious product comprising:
    adding a cementitious material, a siliceous material and a material comprising substantially calcium silicate hydrate to water to form a slurry;
    forming a green shaped article from the slurry; and
    curing the article in an autoclave;
        wherein the material comprising substantially calcium silicate hydrate is formed by reacting a siliceous reactant with a calcareous reactant in the presence of water, the reaction being terminated prior to complete conversion of the reactants to calcium silicate hydrate such that the material includes unreacted siliceous reactant.

2. A method as claimed in claim 1 wherein the material comprising substantially calcium silicate hydrate has a bulk density between 0.06 and 0.3 g/cm$^3$.

3. A method as claimed in claim 1 wherein the material comprising substantially calcium silicate hydrate is provided by reacting a siliceous reactant with a calcareous reactant in the presence of water, wherein at least 90 wt % of the siliceous reactant has a particle size of less than 100 microns.

4. A method as claimed in claim 1 wherein fibrous and/or other additives are added to the slurry prior to the formation of the green shaped article.

5. A method as claimed in claim 1 wherein the green shaped article is formed by the Hatschek process.

6. A method as claimed in claim 1 wherein the green shaped article is formed by filter process.

7. A method as claimed in claim 1 wherein the green shaped article is formed by injection moulding.

8. A method as claimed in claim 1 wherein the green shaped article is formed by extrusion.

9. A method as claimed in claim 3 wherein the reaction is terminated prior to complete conversion of the reactants to calcium silicate hydrate.

10. A method as claimed in claim 3 wherein the reaction is conducted for less than 4 hours.

11. A method as claimed in claim 3 wherein the reaction is conducted over a period of up to 2 hours with at least 80% of the calcareous reactant material being converted to calcium silicate hydrate.

12. A method as claimed in claim 3 wherein prior to or during the reaction, water is added in an amount of up to 30 times the total weight of the siliceous and calcareous reactants.

13. A method as claimed in claim 3 wherein the reaction is conducted at a temperature of between 120 and 250° C.

14. A method as claimed in claim 3 wherein the reaction is conducted at a temperature of between 160 and 180° C.

15. A method as claimed in claim 3 wherein the reaction is conducted at a pressure of between 200 and 4000 kPa.

16. A method as claimed in claim 3 wherein the reaction is conducted at a pressure between 600 and 1000 kPa.

17. A method as claimed in claim 3 wherein the calcareous reactant and siliceous reactant are reacted in a molar ratio of $CaO:SiO_2$ between 0.1 and 1.2.

18. A method as claimed in claim 3 wherein the calcareous reactant and siliceous reactant are reacted in a molar ratio of $CaO;SiO_2$ between 0.3 and 0.8.

19. A method as claimed in claim 3 wherein the siliceous reactant has a particle size of 90 wt % less than 70 microns.

20. A method as claimed in claim 3 wherein the siliceous reactant has a particle size of 90 wt % less than 50 microns.

21. A method as claimed in claim 3 wherein the siliceous reactant and/or siliceous material is amorphous.

22. A method as claimed in claim 3 wherein the siliceous reactant and/or siliceous material is crystalline.

23. A method as claimed in claim 3 wherein the calcareous reactant is lime.

24. A method as claimed in claim 3 wherein the calcareous reactant is quick lime.

25. A method as claimed in claim 3 wherein the calcareous reactant contains greater than 90% CaO.

26. A method as claimed in claim 3 wherein the siliceous reactant and/or siliceous material is selected from the group consisting of silica, quartz, quartz rock, quartzite sand, diatomaceous earth, silica fume, rice hull ash, fly ash, blast furnace slag, granulated slag, steel slag, crystalline or air cooled slag, geothermal silica and mixtures thereof.

27. A method as claimed in claim 3 wherein the siliceous reactant and the calcareous reactant originate from a single source material.

28. A method as claimed in claim 3 wherein the siliceous reactant and the calcareous reactant originate from separate source materials.

29. A method as claimed in claim 1 wherein the cementitious material is selected from the group consisting of cement, lime, lime containing material, Portland cement, off-white cement, blended cement, hydrated lime or mixtures thereof.

30. A method as claimed in claim 1 wherein the cementitious material and the siliceous material originate from a single source material.

31. A method as claimed in claim 1 wherein the cementitious material and the siliceous material originate from separate source materials.

32. A method as claimed in claim 1 wherein the cementitious products is treated with silane, siloxane and/or silicone to reduce its water absorption and surface water permeability characteristics.

33. A method as claimed in claim 1 wherein the material comprising substantially calcium silicate hydrate is added in sufficient quantities such that the resultant cementitious produce has a density between 0.5 and 1.2 $g/cm^3$.

34. A formulation for preparing a cementitious product comprising:
  a cementitious material;
  a siliceous material; and
  a material formed by reacting a siliceous reactant with a calcareous reactant in the presence of water, the reaction being terminated prior to complete conversion of the reactants to calcium silicate hydrate such that the material is a mixture of calcium silicate hydrate and unreacted siliceous reactant.

35. A formulation as claimed in claim 34 wherein the mixture has a bulk density of between 0.6 and 0.3 $g/cm^3$.

36. A formulation as claimed in claim 34 wherein the mixture is produced by reacting a siliceous reactant with a calcareous reactant in the presence of water, at least 90 wt % of the siliceous reactant having a particle size of less than 100 microns.

37. A formulation as claimed in claim 34 further including water.

38. A formulation as claimed in claim 34 wherein the mixture is added in an amount greater than zero and up to 80% by weight of dry ingredients.

39. A formulation as claimed in claim 34 wherein the mixture is added in an amount greater than zero and up to 50% by weight of dry ingredients.

40. A formulation as claimed in claim 34 wherein the mixture is added in sufficient quantities that the resultant cementitious product has a density between 0.5 and 1.2 $g/cm^3$.

41. A formulation as claimed in claim 34 wherein the amount of siliceous material is between 10 and 80% by weight of dry ingredients.

42. A formulation as claimed in claim 34 wherein the amount of siliceous material is between 40 and 65% by weight of dry ingredients.

43. A formulation as claimed in claim 34 wherein the siliceous reactant and/or siliceous material is selected from the group consisting of silica, quartz, quartz rock, quartzite sand, diatomaceous earth, silica fume, rice hull ash, fly ash, blast furnace slag, granulated slag, steel slag, crystalline or air-cooled slag, geothermal silica and mixtures thereof.

44. A formulaton as claimed in claim 34 wherein the siliceous reactant and/or the siliceous material is amorphous.

45. A formulation as claimed in claim 34 wherein the siliceous reactant and/or the siliceous material is crystalline.

46. A formulation as claimed in claim 34 wherein the amount of cementitious material is between 10 and 80% by weight of dry ingredients.

47. A formulation as claimed in claim 34 wherein the amount of cementitious material is between 30 and 40% by weight of dry ingredients.

48. A formulation as claimed in claim 34 wherein the cementitious material is selected from the group consisting of cement, lime, lime containing material, Portland cement off-white cement, blended cement, hydrated lime or mixtures thereof.

49. A formulation as claimed in claim 34 wherein the siliceous material and the cementitious material originate from a single source material.

50. A formulation as claimed in claim 34 wherein the siliceous material and the cementitious material originate from separate source materials.

51. A formulation as claimed in claim 36 wherein the calcareous reactant is lime.

52. A formulation as claimed in claim 36 wherein the calcareous reactant is quick lime.

53. A formulation as claimed in claim 36 wherein the calcareous reactant contains greater than 90% CaO.

54. A formulation as claimed in claim 36 wherein the siliceous reactant and the calcareous reactant originate from a single source material.

55. A formulation as claimed in claim 36 wherein the siliceous reactant and the calcareous reactant originate from separate source materials.

56. A formulation as claimed in claim 34 further including 0–25% by weight of dry ingredients, of an asbestos fibre material.

57. A formulation as claimed in claim 34 further including 0–25% by weight of dry ingredients, of a non-asbestos fibrous material selected from the group consisting of cellulose wood fibres, non-wood cellulose fibres, mineral wool, steel fibres, synthetic polymer fibres selected from the group consisting of polyamides, polyesters, polypropylene, polymethylpentene, polyacrylonitrile, polyacrylamide, viscose, nylon, PVC, PVA and rayon, and glass, ceramic or carbon and mixtures thereof.

58. A formulation as claimed in claim 57 wherein the fibres are cellulose fibres which are bleached, unbleached, partially bleached or mixtures thereof.

59. A formulation as claimed in claim 56 wherein the amount of fibrous material is between 2 and 15% by weight of dry ingredients.

60. A formulation as claimed in claim 56 wherein the amount of fibrous material is between 5 and 14% by weight of dry ingredients.

61. A formulation as claimed in claim 34 further including 0–40% by weight of dry ingredients, of other additives selected from the group consisting of fillers, fire retardants, thickeners, colorants, pigments, water sealing agents, water reducing agents, water retaining agents, setting rate modifiers, hardeners, filler aids, plasticisers, dispersants, forming agents, defoaming agents, flocculating agents, waterproofing agents, density modifiers and mixtures thereof.

62. A formulation as claimed in claim 34 further including 0–40% by weight of dry ingredients, of other additives selected from the group consisting of mineral oxides, mineral hydroxides and clays, metal oxides and hydroxides, magnesite, dolomite, aluminum powder, alumina trihydrate, kaolin, mica, metakaolin, silica fume, calcium carbonate, wollastonite, methyl cellulose and mixtures thereof.

63. A cementitious product comprising the autoclave cured reaction product of the formulation as claimed in claim 34.

64. A cementitious product produced by the method of claim 33.

65. A method as claimed in claim 2 wherein the material comprising substantially calcium silicate hydrate is provided by reacting a siliceous reactant with a calcareous reactant in the presence of water under pressure and elevated temperature, wherein:
at least 90 wt % of the siliceous reactant has a particle size of less than 100 microns;
fibrous and/or other additives are added to the slurry prior to the formation of the green shaped article and the green shaped article is formed by one of the Hatschek process, the green filter process, injection moulding, and extrusion;
the reaction is conducted over a period of up to 2 hours with at least 80% of the calcareous reactant material being converted to calcium silicate hydrate;
prior to or during the reaction, water is added in an amount of up to 30 times the total weight of the siliceous and calcareous reactants;
the reaction is conducted at a temperature of between 160 and 180° C.;
the reaction is conducted at a pressure between 600 and 1000 kPa;
the calcareous reactant and siliceous reactant are reacted in a molar ratio of $CaO:SiO_2$ between 0.3 and 0.8;
the siliceous reactant has a particle size of 90 w to less than 50 microns;
the siliceous reactant an/or siliceous material is either amorphous or crystalline and is selected from the group consisting of silica, quartz, quartz rock, quartzite sand, diatomaceous earth, silica fume, rice hull ash, fly ash, blast furnace slag, granulated slag, steel slag, crystalline or air cooled slag, geothermal silica and mixtures thereof;
the calcareous reactant is either lime or quick lime; and
the calcareous reactant contains greater than 90% CaO and
the cementitious material is selected from the group consisting of cement, lime, lime-containing material, Portland cement, off-white cement, blended cement, hydrated lime or mixtures thereof;
the cementitious product is treated with silane, siloxane and/or silicone to reduce its water absorption and surface water permeability characteristics; and
the material comprising substantially calcium silicate hydrate is added in sufficient quantities such that the resultant cementitious product has a density between 0.5 and 1.2 $g/cm^3$.

66. A formulation as claimed in claim 37 wherein:
The mixture is added in an amount up to 500 parts by weight of dry ingredients;
the mixture is added in sufficient quantities that the resultant cementitious product has a density between 0.5 and 1.2 $g/cm^3$;
the amount of siliceous material is between 40 and 65% by weight of dry ingredients;
The siliceous reactant and/or siliceous material is selected from the group consisting of silica, quartz, quartz rock, quartzite sand, diatomaceous earth, silica fume, rice hull ash, fly ash, blast furnace slag, granulated slag, steel slag, crystalline or air-cooled slag, geothermal silica and mixtures thereof and is either amorphous or crystalline;
the amount of cementitious material is between 30 and 40% by weight of dry ingredients;
the cementitious material is selected from the group consisting of cement, lime, lime-containing material, Portland cement, off-white cement, blended cement, hydrated lime or mixtures thereof:
the calcareous reactant contains greater than 90% CaO;
0–25% by weight of dry ingredients are of an asbestos fibre material or of a non-asbestos fibrous material selected from the group consisting of wood or non-wood, bleached, unbleached, partially bleached or mixtures thereof, cellulose wood fibres, mineral wool, steel fibres, synthetic polymer fibres selected from the group consisting of polyamides, polyesters, polypropylene, polymethylpentene, polyacrylonitrile, polyacrylamide, viscose, nylon, PVC, PVA and rayon, and glass, ceramic or carbon and mixtures thereof;
the amount of fibrous material is between 5 and 14% by weight of dry ingredients;
0–40% by weight of dry ingredients are of other additives selected from the group consisting of fillers, fire retardants, thickeners, colorants, pigments, water sealing agents, water reducing agents, water retaining agents, setting rate modifiers, hardeners, filler aids, plasticisers, dispersants, forming agents, defoaming agents, flocculating agents, waterproofing agents, density modifiers and mixtures thereof; and a further 0–40% by weight of dry ingredients are of other additives selected from the group consisting of mineral oxides, mineral hydroxides and clays, metal oxides and hydroxides, magnesite, dolomite, aluminum powder, alumina trihydrate, kaolin, mica, metakaolin, silica fume, calcium carbonate, wollastonite, methyl cellulose and mixtures thereof.

67. A cementitious product comprising the autoclave cured reaction product of the formulation as claimed in claim 65.

68. A formulation for preparing a cementitious product comprising:

a cementitious material;

a siliceous material that reacts during autoclaving; and a material comprising substantially calcium silicate hydrate, the material being formed by reacting a siliceous reactant with a calcareous reactant in the presence of water, the reaction being terminated prior to complete conversion of the reactants to calcium silicate hydrate such that the material is a mixture of calcium silicate hydrate and unreacted siliceous reactant.

69. The formulation of claim 68, wherein the siliceous material is selected from the group consisting of ground sand and fine quart.

70. The formulation of claim 68, wherein the material being substantially calcium silicate hydrate is a mixture of calcium silicate hydrate and unreacted siliceous reactant.

71. A method for forming a cementitious product comprising:

forming a material comprising substantially calcium silicate hydrate, the material being formed by reacting a siliceous reactant with a calcareous reactant in the presence of water, the reaction being terminated prior to complete conversion of the reactants to calcium silicate hydrate such that the material is a mixture of calcium silicate hydrate and unreacted siliceous reactant;

adding a cementitious material, a siliceous material and the mixture to water to form a slurry forming a green shaped article from the slurry; and curing the article in an autoclave.

72. The method of claim 71, wherein the mixture has a bulk density between 0.06 and 0.3 g/cm$^3$.

73. The method of claim 71, wherein at least 90 wt % of the siliceous reactant has a particle size of less than 100 microns.

74. The method of claim 71, wherein the reaction is conducted for less than 4 hours.

75. The method of claim 71, wherein the reaction is conducted over a period of up to 2 hours with at least 80% of the calcareous reactant being converted to calcium silicate hydrate.

76. The method of claim 71, wherein the calcareous reactant and the siliceous reactant are reacted in a molar ratio of CaO:SiO$_2$ between 0.1 and 1.2.

77. The method of claim 71, wherein the siliceous reactant has a particle size of 90 wt % less than 70 microns.

78. The method of claim 71, wherein the mixture is added in sufficient quantities that the resultant cementitious product has a density between 0.5 and 1.2 g/cm$^3$.

* * * * *

UNITED STATES PATENT AND TRADEMARK OFFICE
CERTIFICATE OF CORRECTION

PATENT NO.    : 6,346,146 B1
DATED         : February 12, 2002
INVENTOR(S)   : Steve Duselis et al.

It is certified that error appears in the above-identified patent and that said Letters Patent is hereby corrected as shown below:

Column 17,
Line 53, change "products" to -- product --
Line 59, change "produce" to -- product --

Signed and Sealed this

First Day of July, 2003

JAMES E. ROGAN
*Director of the United States Patent and Trademark Office*